United States Patent [19]

Hardiman et al.

[11] 3,939,920

[45] Feb. 24, 1976

[54] TIGHTENING METHOD AND SYSTEM

[75] Inventors: Russell J. Hardiman, Sellersville; Stanley K. Smith, Lansdale, both of Pa.

[73] Assignee: Standard Pressed Steel Co., Jenkintown, Pa.

[22] Filed: Sept. 19, 1974

[21] Appl. No.: 507,429

[52] U.S. Cl. ........................ 173/1; 29/240; 173/12; 235/150.1; 235/151.3

[51] Int. Cl.² ........................................ B23Q 19/06

[58] Field of Search .................... 173/1, 12; 29/240

[56] References Cited

UNITED STATES PATENTS

| | | | |
|---|---|---|---|
| 3,454,111 | 7/1969 | Niess | 173/12 |
| 3,693,726 | 9/1972 | Hornig et al. | 173/12 |

*Primary Examiner*—Ernest R. Purser
*Attorney, Agent, or Firm*—Andrew L. Ney; Robert P. Seitter; Aaron Nerenberg

[57] ABSTRACT

A tightening method and system for practicing same are disclosed herein for tightening a fastener to a desired axial load. According to the method, torque is applied to the fastener until it is tightened to its yield point and either the torque applied at the yield point or the angular rotation of the fastener at the yield point are determined and are used to determine the axial load acting on the joint assembly and these determined characteristics are used to determine either the torque or angular rotation required to tighten the fastener to the desired load. Thereafter, torque is again applied to the fastener and when the actual torque being applied or actual angular rotation of the fastener substantially equals that required to tighten the fastener to the desired load, the application of torque is discontinued.

The tightening system disclosed for practicing the method includes a wrench for applying torque to a fastener and including means for developing a signal representative of the torque applied to or angular rotation of the fastener and means for developing an actuating signal when the fastener has been tightened to its yield point. The actuating signal shuts off the wrench and feeds the signal representative of torque or angular rotation at the yield point to a memory device including predetermined load-torque relationships or a predetermined load-angular rotation relationship for the fastener. From these relationships the torque or angular rotation required to tighten the fastener to the desired load can be determined and a signal representative thereof is developed and stored for comparison with a signal representative of the actual torque or angular displacement of the fastener as the wrench again applies torque to the fastener. When the compared signals are substantially equal, a control signal is developed for shutting off the wrench.

27 Claims, 7 Drawing Figures

TIGHTENING METHOD AND SYSTEM

This invention relates to a method and system for tightening fasteners and, more particularly, to a method and system for tightening fasteners to a desired axial load.

In the design of structural joints secured by mechanical fastener systems, it is usual to provide for the fasteners to exert a desired clamping force or load on the structural members to insure the integrity of the joint. When the joints are assembled, therefore, it is desireable that the fasteners be tightened to exert a predetermined axial load on the associated structural members. However, prior art tightening techniques for tightening threaded fasteners such as nuts and bolts to exert a predetermined load on associated structural members are not entirely satisfactory. For example, the most accurate tightening technique involves a measurement of the axial strain or stretch of the bolt while it is being tightened and relating the stretch to the stress or axial load acting on the bolt through previously calculated stress-strain relationships. While most accurate, practical applications do not usually permit measurement of the stretch of the bolt and, in those instances where the stretch can be measured, it is a time consuming and relatively expensive technique. Accordingly, this technique is used in relatively few applications outside of laboratory testing.

Another known tightening technique and that most commonly used in most joint assembly operations involves the use of torque controlled tools, that is, tools that indicate when the torque applied to the fastener equals or exceeds a predetermined torque and stop tightening the fastener in response thereto. Torque measurement is relatively easy and since torque is related to the axial force induced in the fastener, and exerted on the structural members, the predetermined torque can be selected to theoretically correspond to the desired predetermined clamp load specified for the joint. However, when tightening threaded fasteners in assembly line operations, wide variations in the actual torque-load relationships are experienced. These variations are caused by a variety of factors including allowable tolerance variations in the dimensions and strength of the fasteners and structural members and lubrication or absence thereof on the mating surfaces of the fasteners and/or the structural members, all of which, in turn cause large variations in the coefficient of friction between the mating surfaces of the joint. In actual practice, variations of up to ± 30% of the axial load on the bolts used for a particular application can be experienced at the same torque level. Accordingly, the torque control technique is not very accurate.

It is an object of this invention, therefore, to provide a tightening method and system for tightening a fastener to a desired axial load.

It is yet another object of this invention to provide a tightening method and system for tightening a fastener to a desired axial load by utilizing general predetermined relationships characteristic of the type of fastener being tightened without using any specific predetermined relationships of the particular fastener being tightened.

It is still another object of this invention to provide a tightening method and system for tightening a fastener to a desired axial load by measuring tightening input characteristics at the yield point of the fastener.

Finally, it is an object of this invention to provide a tightening method and system for tightening fasteners to a desired axial load that is reliable, economical and accurate.

These and other objects of this invention are accomplished by tightening a fastener in a joint assembly to the yield point by the application of torque which causes rotation of the fastener and by measuring one of the input characteristics preferably of a torque-rotation curve which could be plotted while tightening the fastener, and determining the magnitude of the measured characteristic at the yield point to determine the axial load on the fastener at the yield point or the frictional characteristic associated with the fastener. Thereafter, the magnitude of the measured characteristic required to provide the desired load in the joint assembly is determined and torque is again applied to the fastener while the measured input characteristic is again measured and when the measured characteristic substantially equals that required to provide the desired load, the application of torque is discontinued.

The tightening system disclosed herein includes a wrench for tightening the fastener to its yield point by the application of torque causing rotation of the fastener and which includes means for measuring one of the input chracteristics, preferably of the torque-rotation curve, while the fastener is being tightened and developing a signal representative thereof. Also included is means for determining when the fastener has been tightened to its yield point and for developing an actuating signal which shuts off the wrench and actuates means responsive to the measured input characteristic signal at the yield point for determining the axial load on the particular fastener being tightened at the yield point. Further included is means responsive to signal representative of the axial load for determining the magnitude of the measured input characteristic required to develop the desired axial load in the fastener and for storing a signal representative thereof. Thereafter, the wrench is activated to again apply torque to the fastener while again measuring the input characteristic and developing a signal representative thereof. The signal developed while torque is again applied is compared to the stored signal and when the compared signals are substantially equal, a control signal is developed which can be used to again shut off the wrench.

More particularly, in either the preferred method or system, the torque or angular rotation of the fastener being tightened is measured and is utilized with a curve illustrating certain relationships between load and the measured characteristic for the general type of fastener being tightened. The relationship, of course, is predetermined and, in the system, is stored in a memory device which is scanned at the yield point to determine the axial load on the fastener at the corresponding measured characteristic.

For a better understanding of the invention disclosed herein, reference is made to the following description of preferred embodiments taken in conjunction with the figures of the accompanying drawing, in which.

Figure 1:
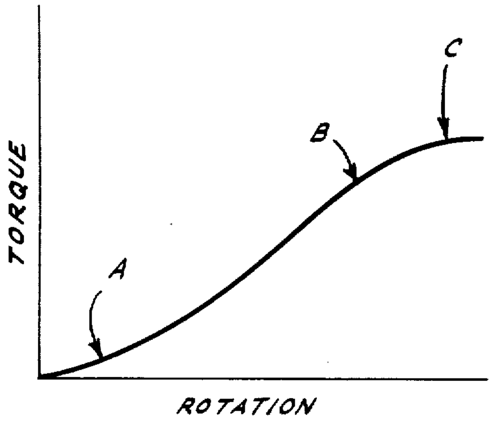
FIG. 1 is a plot of a curve illustrating the characteristics of a typical torque-rotation relationship experienced by a fastener during a tightening cycle and graphically illustrating an underlying principle of the invention.

Referring to FIG. 1, there is illustrated a typical torque-rotation curve for a threaded fastener being tightened with the torque plotted along the vertical axis and with the angular displacement or rotation plotted along the horizontal axis. The curve includes an initial or pretightening region extending from the intersection of the torque and rotation axes to point A. In the pretightening region, mating threads of the fastener assembly have been engaged and one of the fasteners is being rotated, but the bearing face of the rotating fastener has not contacted the adjacent face of the structural member included in the joint. At point A on the curve the structural members have been pulled together by the fastener assembly and actual tightening of the joint commences. In the art, the torque at point A is commonly referred to as the "snug" torque. In the tightening region of the curve, extending from point A to point B, axial force is developed in the fastener assembly members which is exerted on the structural members as the clamping force. In this region, the curve is generally linear. At point B, the limit of proportionality of the joint assembly has been exceeded and the rotation of the fastener member starts increasing at a faster rate than the torque. For purposes of this application, point B will be considered as the start of the yield region, but it will be understood that beyond point B, load will still be induced at the point assembly but at a non-linear rate of increase. Point C corresponds to the yield point of the joint assembly and while the definition of yield point varies slightly, can be considered to be the point beyond which strain or stretch of the bolt is no longer purely elastic.

Figure 2:
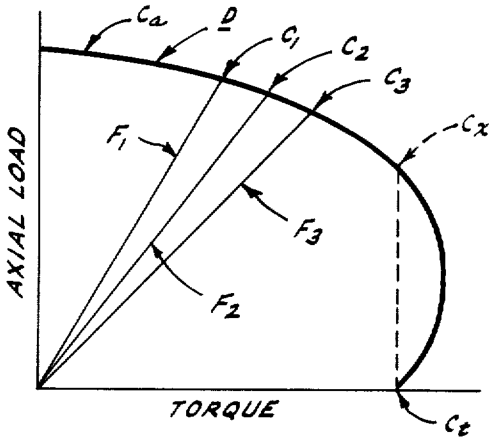
FIG. 2 is a plot of a curve illustrating the relationship of combined axial and torsional loading on a fastener and its relationship at its yield point and FIG. 2A is a plot of a curve illustrating the relationship of axial load on an angular rotation of a fastener.

Referring now to FIG. 2, there is illustrated a curve D representative of the yield point for any particular type of fastener under combined axial and torsional loading with the axial load plotted along the vertical axis and with the torque plotted along the horizontal axis. Curve D is actually comprised of an infinite number of yield points, three of which $C_1$, $C_2$ and $C_3$ are specifically indicated, determined by various combinations of axial and torsional loads applied to the fastener. For fasteners, the various combinations of axial and torsional loads are determined by the coefficient of friction or frictional characteristic between the fastener and its mating surfaces. With no friction, that is, under axial load only, the yield point would correspond to point $C_a$ on curve D and for infinitely high coefficients of friction, that is under torsional load only, the yield point would correspond to point $C_t$ on Curve D. Accordingly, yield points $C_1$, $C_2$ and $C_3$ correspond to the yield point on load-torque curves $F_1$, $F_2$ and $F_3$, respectively, illustrating the load-torque relationship for a fastener under different frictional characteristics. Curves $F_1$, $F_2$ and $F_3$ are linear to the yield point and FIG. 2 clearly illustrates that the variations experienced when utilizing load-torque relationships for tightening fasteners result from the variations in frictional characteristics. According to one of the underlying principles of operation of this invention, the frictional characteristic for any particular fastener can, in effect, be determined and, accordingly, the exact load-torque relationship or curve $F_1$, $F_2$ or $F_3$ can be determined.

Still referring to FIG. 2, it can be seen that a portion of curve D extending from a point $C_x$ to point $C_t$ is generally parabolic so that each value of torque in that portion corresponds to two different load values. However, in practice, this portion of the curve represents the yield point under frictional characteristics significantly higher than those experienced in actual practice and can be ignored for purposes of this invention. If a torque value higher than the projection of point $C_t$ on the torque axis is experienced while tightening a fastener, it would indicate that a serious defect exists in the joint assembly and the tightening of the fastener would be discontinued.

Figure 3:
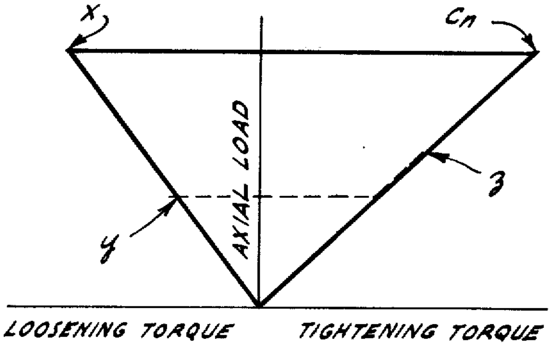
FIG. 3 is a plot of a curve illustrating the characteristics of a typical load-torque relationship experienced by a fastener during a tightening cycle in accordance with one embodiment of this invention.

Referring now to FIG. 3, a tightening cycle experienced by a fastener being tightened by a method in accordance with a preferred embodiment of this invention is illustrated on a load-torque curve. The axial load induced in the fastener is plotted along the vertical axis and the torque is plotted along the horizontal axis. Tightening torque applied to the fastener is illustrated to the right of the intersection of the load and torque axes and loosening torque applied to the fastener is illustrated to the left of the intersection of the load and torque axes. Torque is applied to the fastener and is measured as the fastener is tightened. At the yield point of the fastener, $C_n$ on FIG. 3, the application of torque is discontinued and the torque applied at the yield point is noted. Since the torque is now known, reference can be made to a predetermined relationship of combined axial and torsional loading at the yield point for the type of fastener being tightened, that is, a curve similar to curve D illustrated in FIG. 2, and the load developed in the fastener at the yield point can be determined as well as the exact frictional characteristic for the fastener.

For example, if the torque applied to the fastener at the yield point is located on the horizontal axis of curve D illustrated in FIG. 2, the corresponding point on curve D can be located as well as the corresponding point on the vertical axis which would indicate the axial load acting on the fastener. In addition, by knowing a particular point on curve D, the frictional characteristic for the particular joint being tightened is also known and can be determined by solving the following equation:

$$F = \frac{T_y}{L_y D}$$

wherein $F$ represents the frictional characteristic of the particular joint which is actually a combination of the various coefficients of friction between the fastener and joint mating surfaces and certain dimensional characteristics of the joint; $T_y$ represents the torque at the yield point; $L_y$ represents the axial load at the yield point; and $D$ represents the basic diameter of the fastener being tightened.

From these known characteristics, the torque required to develop a desired axial load in the fastener can be determined. According to one technique for determining the torque required to develop the desired axial load, a simple equation can be solved as follows:

$$T_d = L_d FD$$

In the above equation $L_d$ represents the desired axial load to be developed in the fastener; $T_d$ represents the torque required to develop the desired axial load in the fastener; $F$ represents the frictional characteristic of the joint; and $D$ again represents the basic diameter of the fastener being tightened. Since both $L_d$ and since $D$ are predetermined, when $F$ is determined as noted above, the equation can be solved for $T_d$.

An alternative technique for determining the torque necessary to develop the desired load in the fastener utilizes the essentially linear relationship between load and torque to the yield point which is shown in the curves $F_1$, $F_2$, $F_3$ illustrated in FIG. 2 of the drawings. Referring to those curves, the following proportion should be clear:

$$\frac{T_d}{L_d} = \frac{T_y}{L_y}$$

In the above proportion, $L_d$ represents the desired axial load to be developed in the fastener; $T_d$ represents the torque necessary to develop the desired axial load in the fastener; $L_y$ represents the axial load on the fastener at the yield point; and, $T_y$ represents the torque applied to the fastener at the yield point. By cross-multiplying the above proportion can be written as the following equation:

$$T_d = L_d \quad \frac{T_y}{L_y}$$

Since $L_d$ is predetermined, $T_y$ is noted while tightening the fastener and $L_y$ is determined from a curve similar to curve D, the above equation can be solved for $T_d$.

Regardless of the technique utilized to determine the torque required to develop the desired axial load, once it has been determined, torque is again applied to the fastener. However, the additional torque is applied so as to loosen the fastener and when the loosening torque now being applied substantially equals the torque required to develop the desired load in the fastener, the application of the torque may be discontinued. At this time, the load acting on the fastener approximately equals the desired load.

Referring to FIG. 3, the load-torque relationship during a typical tightening and loosening is illustrated in solid lines. Since the loosening torque acts in a direction opposite the tightening torque, the loosening torque is plotted on the left side of the load axes. It can be seen that the torque required to actually loosen the fastener is less than that required to tighten the fastener and that once the fastener is actually loosened, as indicated at point X on the curve, the loosening torque applied to the fastener decreases in a generally linear relationship with load until neither load nor torque acts on the fastener at which point the curve terminates at the intersection of the load-torque axes. From point X to its terminal point, the loosening torque curve does not correspond to the tightening torque curve so that loosening the fastener to a torque determined in accordance with the above techniques would develop an axial load in the fastener approximately, but not exactly equal to the desired load. For better accuracy, it has been determined that the fastener should be loosened to a torque slightly lower than that required to develop the desired load in the joint and is illustrated as point Y on the curve. The final loosening torque should be at least about 5% lower than that required to develop the desired load in the joint. Thereafter, torque is again applied to the fastener to tighten it, as illustrated in dotted lines on FIG. 3 and when the tightening torque equals to torque required to develop the desired axial load on the fastener, point Z on the tightening curve illustrated in FIG. 3, the application of torque is discontinued. By retightening the fastener, the load-torque relationship experienced by the fastener when it was tightened to the yield point is again assumed and, thus, the accuracy of the method is improved.

Figure 2A:
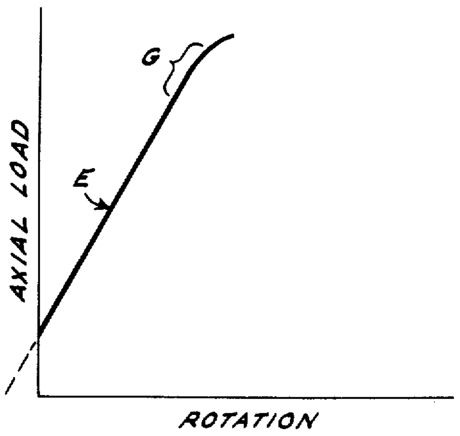

Referring to FIG. 2A there is illustrated a curve E representative of the axial load-rotation relationship for any particular type of fastener in a similar joint. For any particular type of fastener in a similar joint, the load-rotation relationship is independent of the frictional characteristics of the joint so that a single curve can be plotted regardless of the frictional characteristics. However, the yield point is variable along the curve since the yield point is determined by both axial and torsional load and since the torsional load is dependent on the friction characteristics of the particular joint being tightened. Accordingly, the yield point is located in a region or zone indicated at G on the curve illustrated in FIG. 2A. With the above in mind, the method in accordance with this invention will now be explained wherein rotation is the measured characteristic. According to this method, torque is applied to the fastener and its angular rotation is measured. At the yield point of the fastener, the application of torque is discontinued and using a predetermined load-angle of rotation, as illustrated in FIG. 2A, the load on the fastener at the yield point is determined. Using the essentially linear relationship of axial load and rotation a proportion similar to that noted above, except using angular rotation rather than torque can be written. As in the above proportion by cross multiplying an equation for the angular rotation required to develop the desired axial load on the fastener can be written and solved. Once the determination has been made, torque is again applied to the fastener to loosen it until the actual angular rotation substantially equals that required to develop the desired axial load in the fastener. Unlike the method wherein torque is utilized as the characteristic input, however, the loosening load-angular rotation curve is generally symmetrical with the tightening load-angular rotation curve so that the fastener can be loosened directly to the angular rotation required to develop the desired load in the fastener and need not be retightened. Obviously, this is somewhat of an advantage over utilizing torque as the input characteristic. However it may be preferable to measure torque since the measurement of angular rotation involves a determination of a zero or starting point from which the measurements should be made and is subject to some interpretation and error. Using the proportion technique for determing the rotation required to develop the desired axial load minimizes the effect of such an error, but a slight error could be carried through the tightening cycle and affect the accuracy of the results. Torque on the other hand presents no such problems as torque is either present or not present and no interpretation is necessary.

Figures 4, 5:
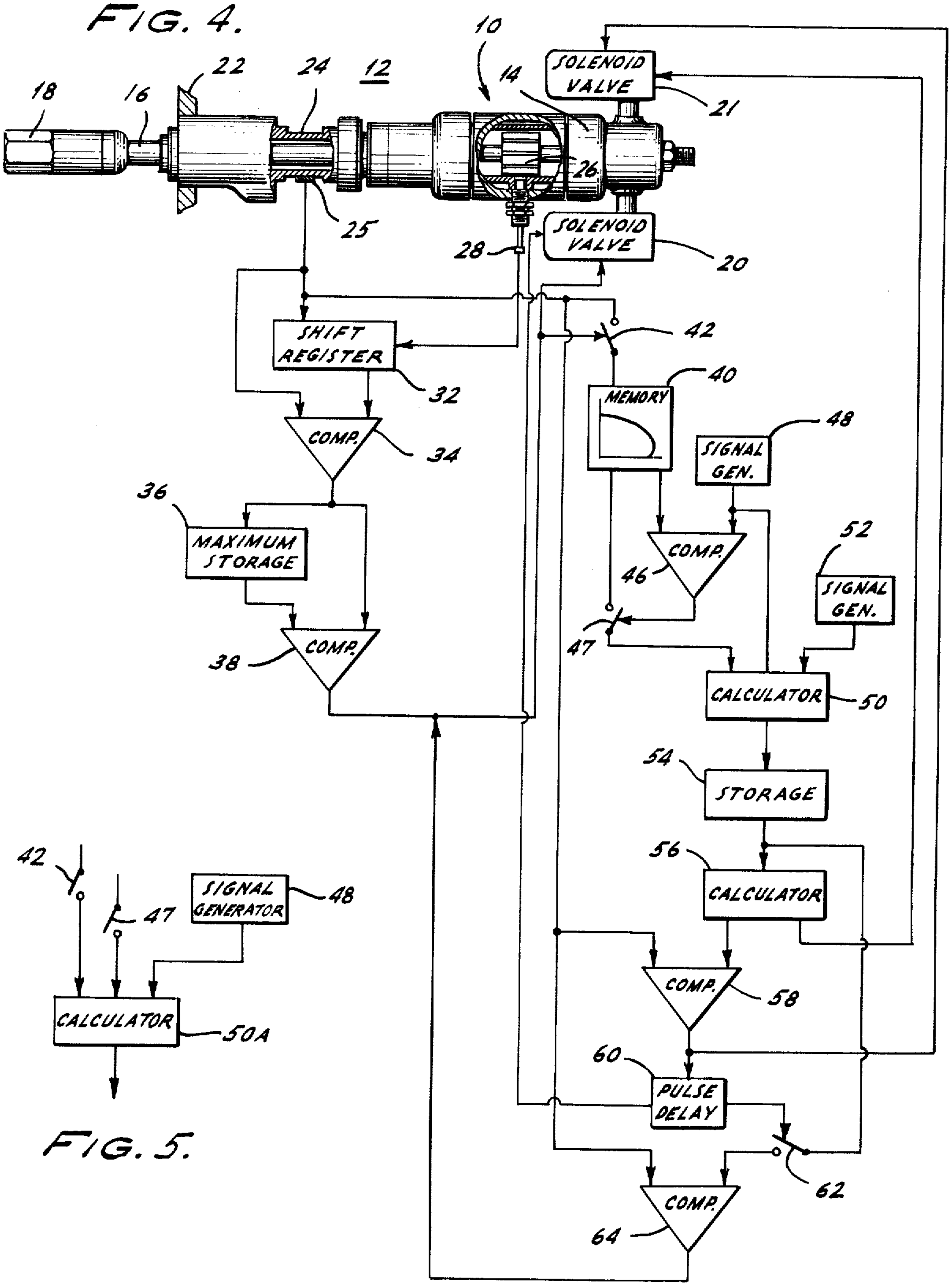
FIG. 4 is a schematic illustration of a tightening system in accordance with one embodiment of this invention.
FIG. 5 is a schematic illustration of a portion of a tightening system similar to that illustrated in FIG. 4, but in accordance with another embodiment of this invention; and, FIG. 6 is a schematic illustration of a tightening system in accordance with another embodiment of this invention.

Referring now to FIG. 4, there is illustrated a tightening system 10 in accordance with this invention. Tightening system 10 includes a wrench 12 having a reversible motor 14, an output drive shaft 16 and driver bit 18. Drive shaft 16 is driven by motor 14 to apply torque and impart rotation to a fastener member engaged by driver bit 18. When the motor is driven in one direction tightening torque is applied to the fastener member and when the motor is driven in the other direction loosening torque is applied to the fastener member. Wrench 12 can be of any conventional type and as is most common, motor 14 can be air powered with the flow of motive fluid being controlled by suitable electrically operated control valves 20 and 21, control valve 20 being operative to apply tightening torque and control valve 21 being operative to apply loosening torque. It should be understood that motor 14 could also be electric, hydraulic or any combination of pneumatic, hydraulic or electric. The exact details of the wrench are not necessary for a proper understanding of the invention and, accordingly, a more specific description is not provided.

Mounted between the housing of motor 14 and a rigid frame 22 on which the wrench is carried, is a suitable transducer or torque cell 24 for generating a varying signal representative of the instantaneous torque being applied to the fastener. Torque cell 24 can be any of a variety of conventional devices and in the embodiment disclosed herein comprises a somewhat flexible annular member having strain gauges 25 secured to its outer periphery so that the reaction torque on the wrench is measured and an electric signal representative of the torque is generated. The reaction torque is, of course substantially equal to and opposite the torque being applied to the fastener. Mounted on drive shaft 16 for rotation therewith and preferably within motor 14, is a suitable encoder 26 that cooperates with a proximity detector 28 for developing signals representative of the incremental angular displacement or rotation of the fastener. Encoder 26 can be any of the variety of suitable devices and in this embodiment includes a series of teeth formed on its outer periphery. Proximity detector 28 senses the presence of metal and, thus, the passage of the teeth and develops electric signals representative of predetermined increments of angular rotation. While examples of torque and rotation measuring devices have been described, it should be understood that any of a variety of devices for accomplishing the noted result can be utilized with the invention.

A control circuit is operatively associated with wrench 12 for controlling the tightening of the fastener and includes a gradient calculating system that determines the instantaneous gradient or slope of the torque-rotation curve which could be plotted for the particular fastener being tightened and develops an electric signal representative thereof. The gradient calculating system comprises shift register means 32 to which the instantaneous torque signal is fed and whose output is clocked by the rotation signal at fixed increments of angular rotation. Accordingly, the output of shift register means 32 is a signal representative of torque a predetermined number of degrees of rotation previous to the instantaneous rotation. A comparator 34 in the form of a suitable subtraction circuit receives the output of shift register 32 and also the signal representative of instantaneous torque and provides an output signal representative of the difference. Since torque signals are subtracted over fixed increments of rotation, the output signal from comparator 34 is representative of the instantaneous gradient of the torque-rotation curve through which the fastener is being tightened.

At this point, it should be noted that while the torque-rotation curve is generally linear from points A to B, it may not be exactly linear and, further, that temporary spikes may be included in the curve for any particular fastener which are caused by lack of or excessive lubricant on a particular place on the mating surfaces of the joint. Thus, the output of comparator 34 which would be a signal of constant magnitude if the torque-rotation curve were exactly linear from the noted points may experience certain changes. For this reason the gradient calculating system may include circuits for determining and storing the maximum gradient experienced up to any point along the torque-rotation curve, that is, up to any point in the tightening cycle. In effect, the maximum gradient experienced in the generally linear region of the curve is considered the gradient for that region of the curve. Accordingly, a storage circuit 36 is provided which stores a signal representative of the maximum gradient and compares instantaneous gradient signals with the maximum, stored signal. If an instantaneous gradient signal is larger than a stored gradient signal, the instantaneous gradient signal is then stored for comparison with instantaneous gradient signals. For a more complete description of storage circuit 36, reference is made to co-pending application Ser. No. 507,417, filed by John T. Boys on Sept. 19, 1974, for Apparatus For and Method of Determining Rotational or Linear Stiffness which application is a continuation-in-part of application Ser. No. 357,920, filed May 7, 1973 for Apparatus For and Method of Determining Rotational or Linear Stiffness.

As also explained in the above-noted co-pending application, when tightening conventional fasteners, the instantaneous torque gradient is related to the maximum torque gradient such that the former is approximately 25% to 75% of the latter at the yield point of the fastener and generally about 50%. By utilizing a comparator circuit 38 the instantaneous gradient signal from comparator 34 can be compared with the maximum gradient signal from storage circuit 36 and when the former is a predetermined percentage or less than the latter, comparator circuit 38 can output a detection signal representative of the fastener assembly having been tightened to its yield point.

The detection signal from comparator 38 is fed to control valve 20 to close the valve and shut off the tool. Simultaneous with closing control valve 20, the detection signal closes a switch device 42 allowing a signal from torque cell 24, representative of the instantaneous torque applied to the fastener at its yield point, to be fed to a memory device 40 which stores the predetermined relationship of combined axial and torsional loading at the yield point for the general type of fasteners being tightened, that is, a curve similar to curve D in FIG. 2. Thus, when the signal representative of the torque at the yield point is processed through memory device 40, the memory is scanned and the load corresponding to the torque applied at the yield point is determined. As will be explained hereinafter, the frictional characteristic of the joint may also be determined in memory device 40. Memory device 40 provides an output signal representative of the axial load on the fastener at the yield point and this signal is fed to a suitable comparator circuit 46 which receives an input signal from a signal generator 48 representative of the predetermined or desired load to be developed in the fastener. If the compared signals are equal, the fastener has been tightened to the desired load and comparator 46 provides no output and, the tightening cycle is terminated. If desired, however, comparator 46 could provide an output signal to an indicator light or some similar indicator device which would actuate that device and indicate that the tightening cycle is over and that the fastener has been tightened to its desired axial load. If the input signal from signal generator 48 is larger than the input signal from memory device 40, the desired load exceeds the axial load at the yield point indicating that the joint assembly is defective. If desired, comparator 46 could provide an output signal to another indicator light or some similar device which would activate that device and indicate the defect. As is most usual, however, the actual load on the fastener at the yield point will be greater than the desired load and comparator 46 provides an output signal to close a switch device 47 connected between memory device 40 and a calculator circuit 50 operative to determine the torque required to develop the desired load in the joint.

Calculator circuit 50 functions in accordance with either of the techniques noted above for determining the torque required to develop the desired axial load in the fastener. In the embodiment illustrated in FIG. 3, calculator circuit 50 solves the equation $T_d = L_d\ FD$ which has been explained above and therefore receives a signal representative of the desired load from signal generator 48, another signal representative of the diameter D from another preset signal generator 52 and an output signal from memory device 40 representative of the frictional characteristic F which signal is fed through switch device 47. Calculator circuit 50 is in the form of suitable multiplication circuits and provides an output signal representative of the torque required to tighten the fastener to the desired load.

As an alternative, calculator circuit 50 could solve the equation $T_d = L_d\ (T_y/Ly)$ and could be in the form of suitable multiplication and division circuits. FIG. 5 illustrates such a circuit 50A and its inputs for solving the alternative equation. Calculator circuit 50A receives a signal from signal generator 48 representative of the desired load to be developed in the fastener, a signal from memory device 40 representative of the axial load on the fastener at the yield point which signal is fed through switch device 47 when the switch device is closed by the signal from comparator 46 and a signal representative of the torque applied to the fastener at the yield point from torque cell 24 which signal is fed through switch device 42. After the calculations have been performed, calculator circuit 50A provides an output signal representative of the torque required to tighten the fastener to the desired load.

Regardless of the exact operation of the calculator circuit the signal representative of the torque required to develop the desired axial load in the fastener is stored in a suitable storage circuit 54 for future comparison with the actual torque applied to the fastener during later operation of the wrench to determine when it should be shut off. Referring back to FIG. 3, it should again be noted that the loosening curve for the load-torque relationship is not symmetrical with the tightening curve. Thus, for greater accuracy, the preferred embodiment of the invention includes another calculator circuit 56 which receives an output signal from storage circuit 54 and calculates a torque slightly lower, preferably at least 5% lower, than that required to develop the desired load in the fastener and outputs a signal representative of a stopping point corresponding to point Z on the loosening curve illustrated in FIG. 3. Another signal from calculator circuit 56 is fed to reversing valve 21 to reverse motor 14 in wrench 12 and thereby apply loosening torque to the fastener. Simultaneously therewith, the signal from calculator circuit 56 representative of the stopping point is fed to a comparator 58 which also receives an input signal from torque cell 24 representative of the loosening torque applied to the fastener. Comparator 58 compares the signals and when the compared signals are equal, a control signal is developed by comparator 58 which is fed to reversing valve 21, to close the valve and stop the application of loosening torque to the fastener and which is also fed to a pulse-delay circuit 60. After a sufficient period of time to assure that motor 14 has stopped, pulse-delay circuit 60 feeds a signal to control valve 20 opening the valve to again apply tightening torque to the fastener and also to a switch device 62 which is connected between storage circuit 54 and a comparator device 64. The signal from storage circuit 54 is now fed to comparator 64 and, as previously explained, is representative of the torque required to develop the desired axial load in the fastener. Comparator 64 also receives a signal from torque cell 24 now representative of the tightening torque being reapplied to the fastener. When the compared signals in comparator 64 are equal, an output signal is provided which is fed to control valve 20 to close the valve and stop motor 14. Thus, it can be seen that the fastener has been tightened to the desired axial load. If desired, the signal representative of the torque required to develop the desired axial load in the fastener, that is, the signal from storage circuit 54 can be fed to a comparator which receives a signal representative of the loosening torque and when the compared signals are equal, the motor is shut off and the tightening cycle terminated. Such a system while not as accurate as that illustrated in FIG. 5 would provide reasonable accuracy sufficient for some applications.

Figure 6:
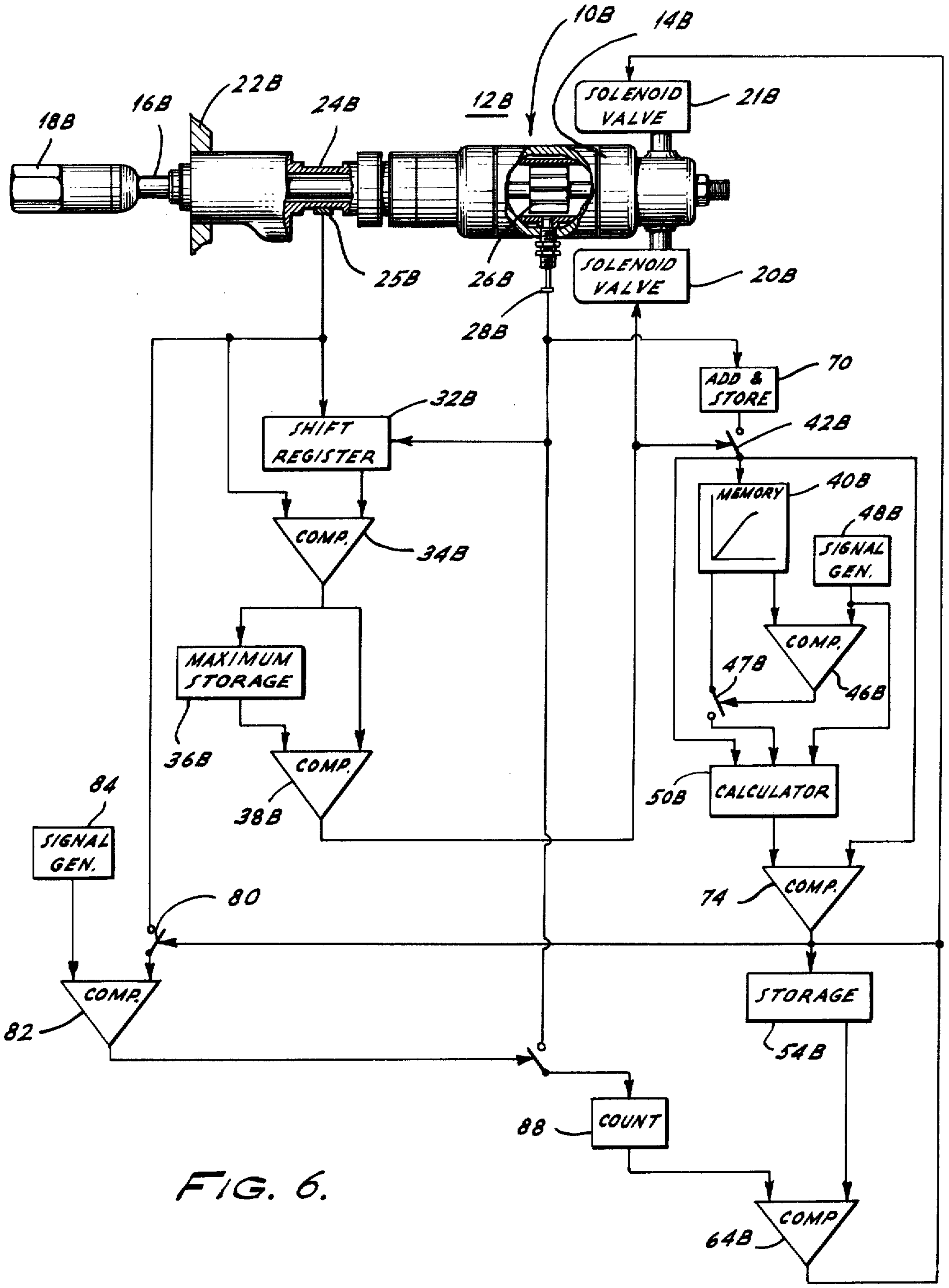

As noted in the discussion of the method in accordance with this invention, the input characteristic measured and utilized in practicing the invention need not be torque but could be the angular rotation of the fastener. Referring to FIG. 6, a tightening system 10B is illustrated which is similar to tightening system 10 illustrated in FIG. 4 except that the input characteristic utilized in the control circuit is angular rotation. Accordingly, like parts in the FIG. 6 embodiment will not be described in detail but will be indicated by the same reference numeral utilized in the description of FIG. 4 and including the suffix B. While the basic system are similar, since proximity detector 28B develops signals representative of incremental angular rotation a suitable adding and storing circuit 70 is connected in the system to receive signals from the proximity detector, add them and provide a signal representative of the total angular rotation of the fastener. Thus, after the yield point has been reached the detection signal developed by comparator 38B is utilized to close control valve 20B and is also fed to a switch 42B between circuit 70 and memory device 40B which has stored therein the relationship of axial load and angular rotation for the type of fastener being tightened, that is, a curve similar to the curve illustrated in FIG. 2A. The signal from circuit 70 scans memory device 40B and, in a manner similar to the torque signal in the FIGS. 4 and 5 embodiment, the memory device determines the axial load on the fastener at the yield point and provides output signals representative thereof.

The signal representative of the load at the yield point is fed to comparator 46B where it is compared with a signal from signal generator 48B representative of the desired load to be developed in the fastener to determine if the actual load on the bolt is less than, equal to or greater than the desired load. If it is less than or equal to the desired load, either no output is developed by comparator 46B or an output signal is developed to actuate appropriate indicator lights as explained with respect to comparator 46 in the embodiment described in FIG. 4; if it is not, an output signal from comparator 46B is fed to switch device 47B allowing a signal representative of the axial load on the joint assembly to be fed from memory device 40B to a calculator circuit 50B which also receives an input signal from signal generator 48B representative of the desired load to be developed on the fastener and an input signal rom adding and storing circuit 70 representative of the angular rotation at the yield point of the fastener being tightened. Similar to calculator circuit 50A, circuit 50B includes suitable multiplying circuits for processing the input signals, and solving the equation $R_d = L_d\,(R_y/L_y)$ where $R_d$ represents the angular rotation of the fastener required to develop the desired axial load, $L_d$ represents the desired axial load, $R_y$ represents the angular rotation at the yield point and $L_y$ represents the axial load at the yield point. Thus, the output signal from calculator circuit 50B is representative of the angular rotation required to develop the desired axial load in the fastener.

The output signal from calculator circuit 50B is fed to a comparator 74 which also receives a signal from adding and storing circuit 70 representative of the angular rotation of the yield point and subtracts the signals to determine the change in angular rotation required to loosen the fastener from the yield point to the desired axial load. The output signal from comparator 74, then, is representative of this change in angular rotation and is fed to a storage circuit 54B which feeds another comparator 64B, also in the form of a subtraction circuit. Another output signal from comparator 74 opens control valve 21 for applying loosening torque to the fastener and also closes a switch 80 connected between a comparator 82 which receives signals from torque cell 24B and from a preset signal generator 84. The signal from signal generator 84 is representative of a minimal torque which should be applied to the fastener and the signal from torque cell 24B is, of course representative of the torque being applied to the fastener. When the instantaneous torque exceeds the minimal torque, comparator 82 provides an output signal which closes a switch 86 connected between proximity detector 28B and a counter 88. Thus, as the fastener is loosened signals representative of increments of rotation of the fastener are added in counter 82 and are also fed to comparator 64B. When the signals fed to comparator 64B are substantially equal, the angular rotation of the fastener substantially equals that required to develop the desired load in the fastener. At this point comparator 68B provides an output signal which is fed to control valve 21 closing the valve and stopping motor 14. It should be realized that use of comparator 82 assures that counter 88 does not count signals from proximity probe 28B which are representative of the backlash in wrench 14B caused by allowable tolerances for the component parts. As previously explained, when using angular rotation as the characteristic input, the fastener may be directly loosened to the angle of rotation required to develop the desired axial load and need not be retightened for improved accuracy as when torque is used as the characteristic input.

While in the foregoing there have been disclosed various embodiments of the invention, it should be understood that various modifications and changes will be obvious to one skilled in the art and, accordingly, are within the intended scope of the invention as recited in the appended claims.

We claim:

1. A tightening system for tightening a fastener to a desired axial load, said system comprising:

wrench means for applying torque and imparting rotation to said fastener;

said wrench means including means for measuring one of the input characteristics experienced by said fastener as it is being tightened;

said wrench means further including means for determining when the yield point of said fastener has been reached and for stopping the application of torque;

means responsive to said yield point determining means and said measuring means for calculating said measured input characteristic required to develop the desired axial load in said fastener; and, control means operatively connected between said wrench means and said means for calculating said measured input characteristic for reapplying torque to said fastener until said measured input characteristic substantially equals said calculated input characteristic.

2. A tightening system in accordance with claim 1 wherein said means for calculating said input characteristic required to develop the desired axial load in said fastener includes memory means storing a predetermined relationship of axial load and the measured input characteristic for fasteners of a type similar to said fastener being tightened.

3. A tightening system in accordance with claim 1 wherein said measuring means develops signals representative of the instantaneous torque being applied to said fasteners.

4. A tightening system in accordance with claim 3 wherein said control means is operative to apply loosening torque to said fastener until the loosening torque being applied approximately equals said calculated torque.

5. A tightening system in accordance with claim 4 wherein said control means is operative to apply loosening torque to said fastener until said loosening torque is a predetermined percentage of said calculated torque.

6. A tightening system in accordance with claim 5 wherein said predetermined percentage is at least 5% less than said calculated torque.

7. A tightening system in accordance with claim 6 wherein said control means is operative to reapply tightening torque to said fastener until said reapplied tightening torque substantially equals said calculated torque.

8. A tightening system in accordance with claim 1 wherein said measuring means develops signals representative of the angular rotation of said fastener.

9. A tightening system in accordance with claim 8 wherein said control means is operative to apply loosening torque to said fastener until said measured angular rotation substantially equals said calculated angular rotation.

10. A tightening system in accordance with claim 8 wherein said control means includes means for activating said measuring means when a predetermined torque is reapplied to said fastener.

11. A method of tightening a fastener to a desired axial load comprising;

applying torque and imparting rotation to said fastener and tightening said fastener to its yield point;

measuring one of the input characteristics experienced by said fastener at its yield point;

determining the magnitude of a parameter related to said measured input characteristic and thereafter calculating the magnitude of said measured input characteristic required to develop said desired axial load in said fastener using said parameter; and reapplying torque to said fastener while measuring said input characteristic and stopping the reapplication of torque when said measured input characteristic approximately equals said calculated input characteristic.

12. A method in accordance with claim 11 wherein said parameter is the axial load on said fastener at its yield point and said measured input characteristic required to develop said desired axial load in said fastener is calculated from a predetermined relationship of axial load and said measured input characteristic at the yield point for fasteners of the type being tightened.

13. A method in accordance with claim 11 wherein said parameter is the frictional characteristic associated with said fastener and said measured input characteristic required to develop said desired axial load in said fastener is calculated from a predetermined relationship of axial load and said measured input characteristic at the yield point for fasteners of the type being tightened.

14. A method in accordance with claim 13 wherein said measured input characteristic is torque.

15. A method in accordance with claim 14 wherein torque is reapplied until the measured torque is a predetermined percentage of the torque required to develop said desired axial load in said fastener.

16. A method in accordance with claim 15 wherein said predetermined percentage is at least 5% less than said torque required to develop said desired axial load in said fastener.

17. A method in accordance with claim 16 wherein tightening torque is reapplied to said fastener until the measured torque of the fastener substantially equals the torque required to develop said desired axial load in said fastener.

18. A method in accordance with claim 17 wherein torque is reapplied until the measured torque of the fastener substantially equals the torque required to develop said desired axial load in said fastener.

19. A method in accordance with claim 13 wherein said measured input characteristic is angular rotation.

20. A method in accordance with claim 18 wherein torque is applied to loosen said fastener until the angular rotation of the fastener substantially equals the angular rotation required to develop said desired axial load in said fastener.

21. A method in accordance with claim 12 wherein said measured input characteristic is torque.

22. A method in accordance with claim 21 wherein torque is reapplied until the measured torque of the fastener substantially equals the torque required to develop said desired axial load in said fastener.

23. A method in accordance with claim 21 wherein torque is reapplied until the measured torque is a predetermined percentage of the torque required to develop said desired axial load in said fastener.

24. A method in accordance with claim 23 wherein said predetermined percentage is at least 5% less than said torque required to develop said desired axial load in said fastener.

25. A method in accordance with claim 24 wherein tightening torque is reapplied to said fastener until the torque substantially equals said measured torque required to develop said desired axial load in said fastener.

26. A method in accordance with claim 12 wherein said measured input characteristic is angular rotation.

27. A method in accordance with claim 26 wherein torque is reapplied to loosen said fastener until the measured angular rotation of the fastener substantially equals the angular rotation required to develop said desired axial load in said fastener.

* * * * *